United States Patent
Koegler et al.

(10) Patent No.: US 10,047,719 B2
(45) Date of Patent: Aug. 14, 2018

(54) WINGLET FOR A WIND TURBINE ROTOR BLADE

(71) Applicant: General Electric Company, Schenectady, NY (US)

(72) Inventors: Klaus Ulrich Koegler, Rheine (DE); Ariane Frere, Brussels (BE); Andreas Herrig, Rheine (DE)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 14/820,720

(22) Filed: Aug. 7, 2015

(65) Prior Publication Data

US 2016/0025066 A1  Jan. 28, 2016

Related U.S. Application Data

(63) Continuation of application No. 13/424,518, filed on Mar. 20, 2012, now Pat. No. 9,103,325.

(51) Int. Cl.
*F03D 1/06* (2006.01)

(52) U.S. Cl.
CPC ........ *F03D 1/0633* (2013.01); *F05B 2240/30* (2013.01); *Y02E 10/721* (2013.01)

(58) Field of Classification Search
None
See application file for complete search history.

(56) References Cited

U.S. PATENT DOCUMENTS

| | | | |
|---|---|---|---|
| 5,102,068 A | 4/1992 | Gratzer | |
| 5,275,358 A | 1/1994 | Goldhammer et al. | |
| 5,332,362 A | 7/1994 | Toulmay et al. | |
| 5,348,253 A | 9/1994 | Grtzer | |
| 5,643,613 A | 7/1997 | Boot et al. | |
| 6,089,502 A | 7/2000 | Herrick et al. | |
| 6,142,738 A | 11/2000 | Toulmay | |
| 7,207,526 B2 | 4/2007 | McCarthy | |
| 7,497,403 B2 | 3/2009 | McCarthy | |
| 7,540,716 B2 | 6/2009 | Wobben | |
| 7,841,836 B2 | 11/2010 | Wobben | |
| 7,931,444 B2 | 4/2011 | Godsk et al. | |
| 7,988,100 B2 | 8/2011 | Mann | |
| 8,241,002 B2 | 8/2012 | Wobben | |
| 8,317,483 B2 | 11/2012 | Gerber et al. | |

(Continued)

FOREIGN PATENT DOCUMENTS

| | | |
|---|---|---|
| EP | 1493660 | 1/2005 |
| EP | 1500814 | 1/2005 |

(Continued)

OTHER PUBLICATIONS

PCT Application No. PCT/US2013/032778 Search Report and Written Opinion dated Jul. 25, 2013.

*Primary Examiner* — Logan Kraft
*Assistant Examiner* — Jason Davis
(74) *Attorney, Agent, or Firm* — Dority & Manning, P.A.

(57) ABSTRACT

In one aspect, a winglet for a rotor blade is disclosed. The winglet may generally include a winglet body extending at least partially between a winglet origin and a blade tip. The winglet body may define a sweep and a pre-bend. The sweep defined between the winglet origin and the blade tip may range from about 0.5% to about 4.0% of a span of the rotor blade. The pre-bend defined between the winglet origin and the blade tip may range from about 1.5% to about 4.5% of the span of the rotor blade.

19 Claims, 6 Drawing Sheets

(56) References Cited

U.S. PATENT DOCUMENTS

| | | |
|---|---|---|
| 2002/0092947 A1 | 7/2002 | Felker |
| 2006/0216152 A1 | 9/2006 | Golinkin et al. |
| 2006/0216153 A1 | 9/2006 | Wobben |
| 2007/0252031 A1 | 11/2007 | Hackett et al. |
| 2009/0027885 A1 | 1/2009 | Hoshi |
| 2009/0074583 A1 | 3/2009 | Wobben |
| 2011/0142677 A1 | 6/2011 | Nanukuttan et al. |
| 2011/0150664 A1 | 6/2011 | Mickeler et al. |

FOREIGN PATENT DOCUMENTS

| | | |
|---|---|---|
| EP | 1596063 | 11/2005 |
| EP | 1645506 | 4/2006 |
| EP | 2378115 | 10/2011 |
| WO | WO 2002/083497 | 10/2002 |
| WO | WO 2005/078277 | 8/2005 |
| WO | WO 2006/111272 | 10/2006 |
| WO | WO 2006/133715 | 12/2006 |
| WO | WO 2008/0617939 | 5/2008 |
| WO | WO 2008/077403 | 7/2008 |

WINGLET FOR A WIND TURBINE ROTOR BLADE

CROSS-REFERENCE TO RELATED APPLICATIONS

The present application is a continuation of U.S. patent application Ser. No. 13/424,518, filed Mar. 20, 2012 and entitled "Winglet for a Wind Turbine Rotor Blade," the disclosure of which is hereby incorporated by reference herein in its entirety for all purposes.

FIELD OF THE INVENTION

The present subject matter relates generally to rotor blades for wind turbines, and more particularly, to winglets for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy output by modifying the size, configuration and capacity of wind turbines. One such modification has been to include a wingtip device, such as a winglet, at the tip of each wind turbine rotor blade. However, the use of conventional winglets often provides a variety of disadvantages. For instance, many conventional winglets are configured as suction side winglets, thereby decreasing the clearance between the rotor blades and the wind turbine tower. Additionally, many conventional winglets are designed solely to reduce noise generated by the wind turbine. As such, these winglets generally do not provide an overall impact on the performance and efficiency of the wind turbine.

Accordingly, a pressure side winglet that generally improves the overall performance and efficiency of a wind turbine would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter discloses a winglet for a rotor blade. The winglet may generally include a winglet body extending at least partially between a winglet origin and a blade tip. The winglet body may define a sweep and a pre-bend. The sweep defined between the winglet origin and the blade tip may range from about 0.5% to about 4.0% of a span of the rotor blade. The pre-bend defined between the winglet origin and the blade tip may range from about 1.5% to about 4.5% of the span of the rotor blade.

In another aspect, the present subject matter discloses a winglet for a rotor blade. The winglet may generally include a winglet body extending between a winglet origin and a blade tip. The winglet body may include a plurality of radial locations between the winglet origin and the blade tip. In addition, the winglet body may define a chord at the blade tip ranging from about 0.0% to about 0.5% of the span of the rotor blade and a chord at the winglet origin ranging from about 1.2% to about 2.6% of the span of the rotor blade. The winglet body may also define a twist angle at each of the plurality of radial locations generally in accordance with the values for twist angle shown in TABLE 1, wherein each of the values for twist angle shown in TABLE 1 may be varied +/−3.0 degrees.

In a further aspect, the present subject matter discloses a winglet for a rotor blade. The winglet may generally include a winglet body defining cross-sectional profiles at a plurality of radial locations along the winglet body generally in accordance with the values shown in TABLE 1. The cross-sectional profiles may be joined so as to define a nominal shape of the winglet body. Additionally, the nominal shape lies in an envelope within +/−10% of each length value provided in TABLE 1, within +/−20 degrees of each cant angle value provided in TABLE 1 and within +/−3 degrees of each twist angle value provided in TABLE 1.

In yet another aspect, the present subject matter discloses a winglet for a rotor blade. The winglet may generally include a winglet body defining cross-sectional profiles at a plurality of radial locations along the winglet body generally in accordance with the values shown in TABLE 1. The cross-sectional profiles may be joined so as to define a nominal shape of the winglet body. Additionally, the nominal shape may be scaled up or scaled down as a function of at least one constant.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
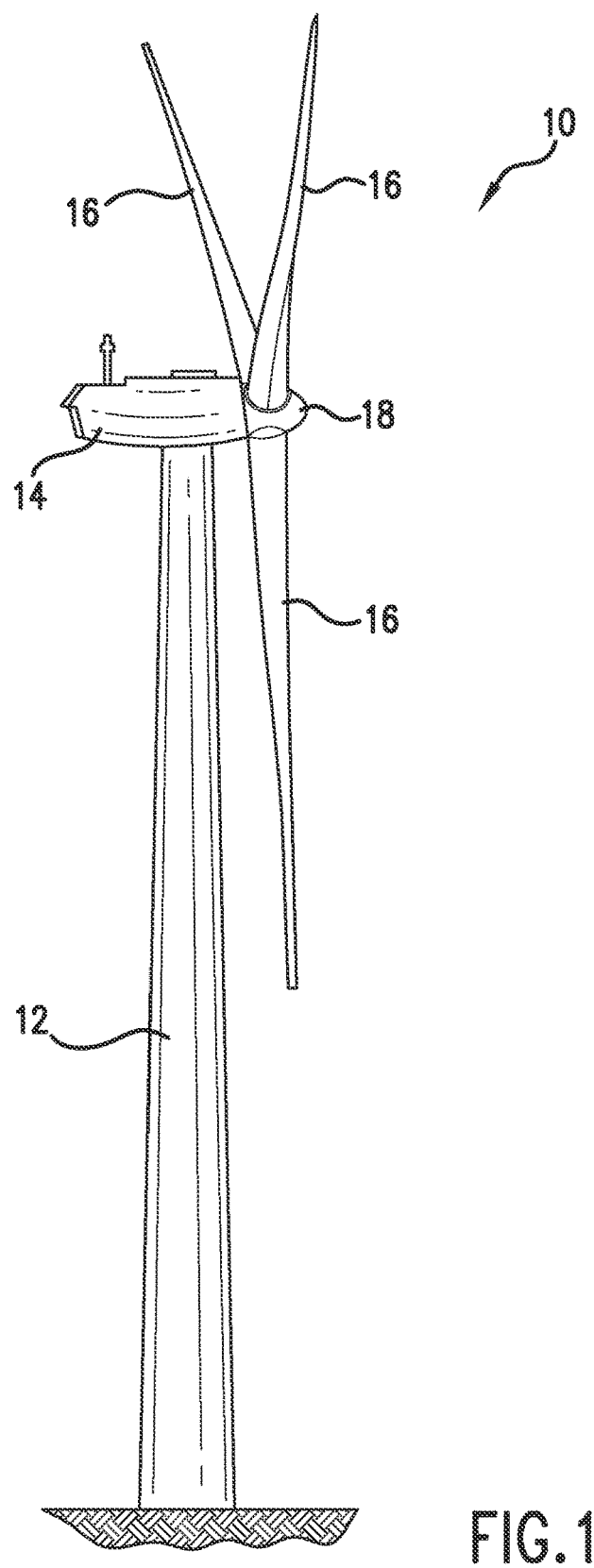
FIG. 1 illustrates a perspective view of one embodiment of a wind turbine of conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a winglet for a wind turbine rotor blade. In particular, the present subject matter discloses a pressure side winglet having a unique geometric shape. For example, in several embodiments, the winglet may be defined by one or more design parameters including, but not limited to, spanwise radius, chord, sweep, pre-bend, twist angle and cant angle. By defining the shape using such design parameters and using particular ranges of values within such design parameters, it has been found that the disclosed winglet may generally improve the overall performance and efficiency of a wind turbine.

Referring now to the drawings, FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
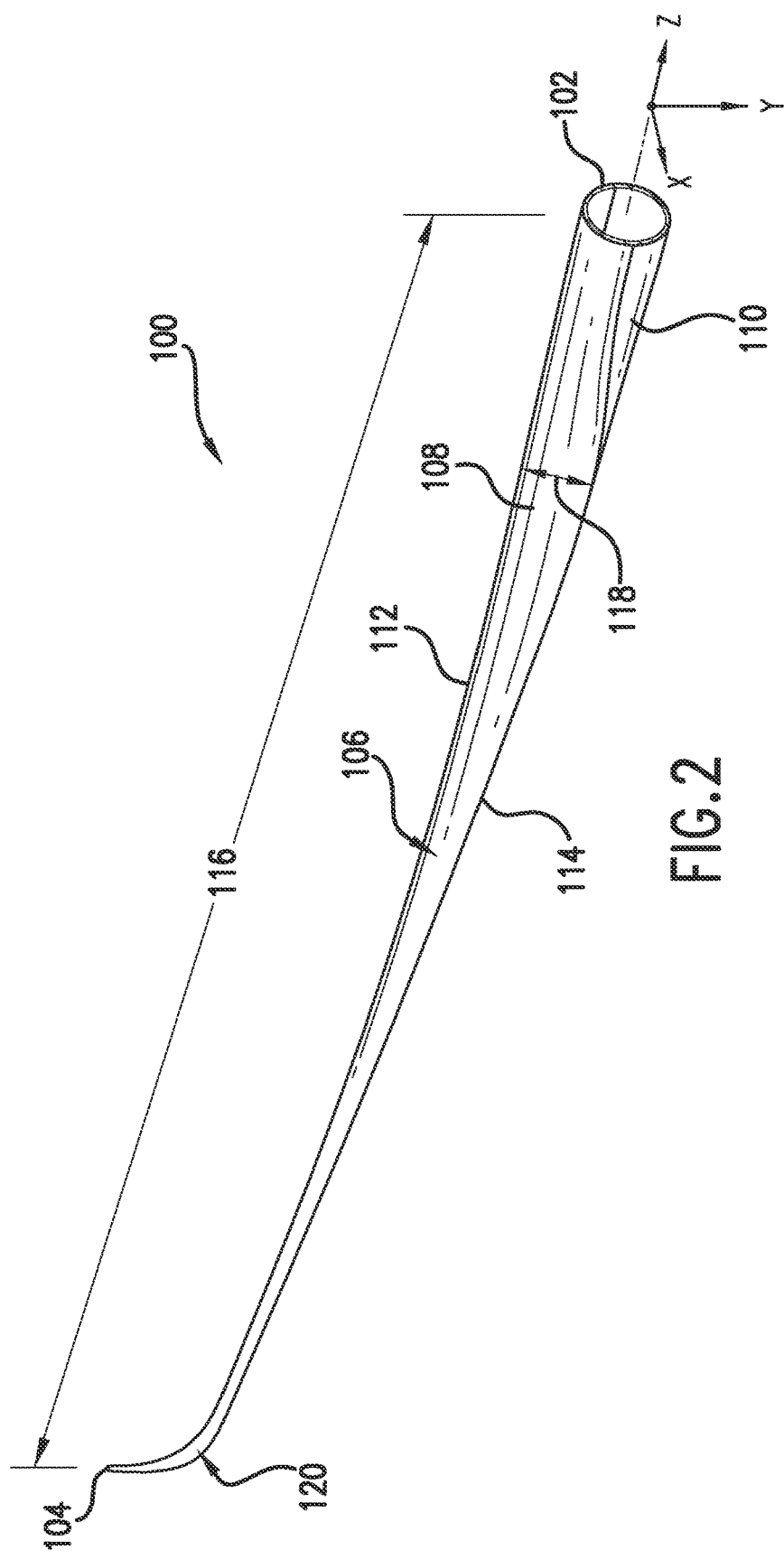
FIG. 2 illustrates a perspective view of one embodiment of a rotor blade suitable for use with the wind turbine shown in FIG. 1 in accordance with aspects of the present subject matter, particularly illustrating the rotor blade including a winglet.

Referring to FIG. 2, a perspective view of one embodiment of a rotor blade 100 suitable for use with a wind turbine 10 (FIG. 1) is illustrated in accordance with aspects of the present subject matter. As shown, the rotor blade 100 generally includes a blade root 102 configured for mounting the rotor blade 100 to the rotor hub 18 of the wind turbine 10 (FIG. 1) and a blade tip 104 disposed opposite the blade root 102. A body 106 of the rotor blade 100 may generally extend from the blade root 102 towards the blade tip 104 and may serve as the outer shell of the rotor blade 100. As is generally understood, the body 106 may define an aerodynamic profile, such as by defining a symmetrical or cambered airfoil-shaped cross-section, to enable the rotor blade 100 to capture kinetic energy from the wind using known aerodynamic principles. As such, the body 106 may generally include a pressure side 108 and a suction side 110 extending between a leading edge 112 and a trailing edge 114. Additionally, the rotor blade 100 may have a span 116 defining the total length of the blade between the blade root 102 and the blade tip 104 and a chord 118 defining the total length of the body 106 between the leading edge 112 and the trailing edge 114. As is generally understood, the chord 118 may vary in length with respect to the span 116 as the rotor blade 100 extends between the blade root 102 to the blade tip 104.

Moreover, as will be described in greater detail below, the rotor blade 100 may also include a pressure side winglet 120 terminating at the blade tip 104. It should be appreciated that, in several embodiments, the winglet 120 may be manufactured as a separate component from the body 106 and, thus, may be configured to be mounted to the body 106 using any suitable means and/or method known in the art (e.g., by using suitable fasteners and/or adhesives). As such, the winglet 120 may be retrofit onto existing rotor blades 100, such as by removing a portion of the exiting rotor blade adjacent to the blade tip 104 and replacing such removed portion with the disclosed winglet 120. Alternatively, the winglet 120 and the body 106 may be formed integrally as a single component. For instance, in one embodiment, the winglet 120 and the body 106 may be cast together in a common mold.

For reference purposes only, it should be appreciated that the global coordinate system referenced herein and illustrated in FIG. 2 is Cartesian, orthogonal and right-handed. The global coordinate system has its origin at the center of the circle defined by the blade root 102 of the rotor blade 100. The global Z-axis indicated by the Z-axis shown in FIG. 2) is defined by a reference line extending normal to the plane in which the circle defined by the blade root 102 lies. The global Z direction is positive in the direction away from the blade tip 104. The global X-axis (indicated by the X-axis shown in FIG. 2) is defined by a reference line extending perpendicular to the Z axis and lying in the rotor plane of the rotor blade 100 (or in the rotor cone, if the wind turbine rotor defines a cone angle, with the blade positioned at a pitch angle of zero, i.e., like for the standard operating condition, in the "constant tip speed ratio" regime). The global Y-axis (indicated by the Y-axis shown in FIG. 2) is defined by a reference line extending perpendicular to both the global Z-axis and the global X-axis.

Figure 3:
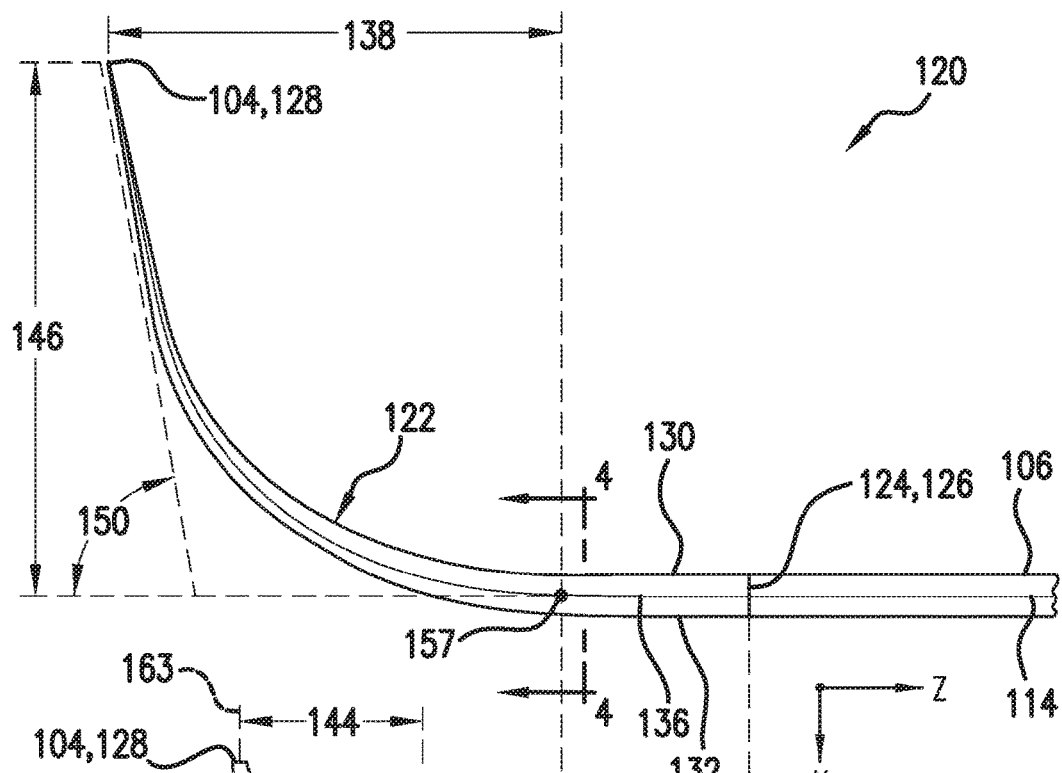
FIG. 3 illustrates a trailing edge view of the winglet shown in FIG. 2.
Figure 4:
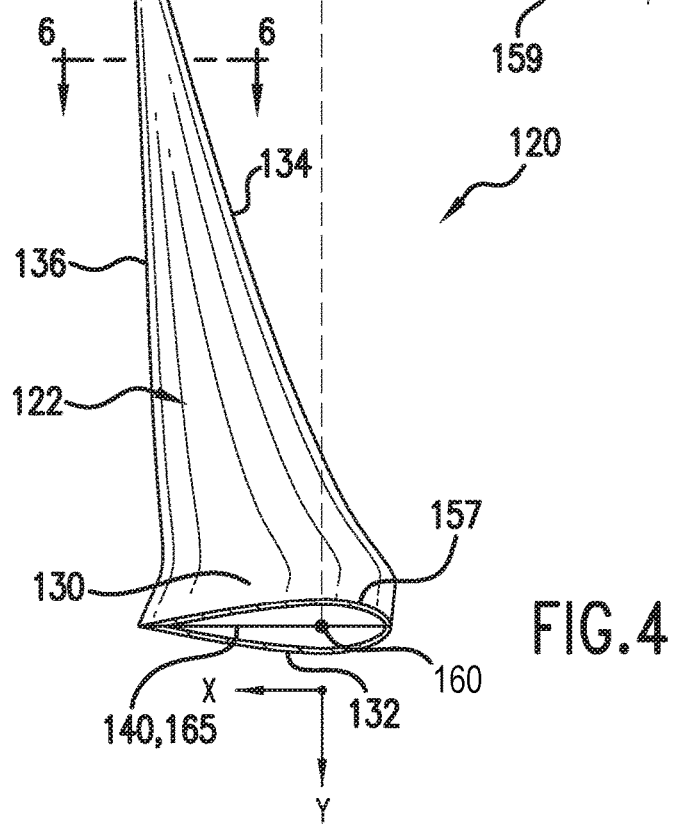
FIG. 4 illustrates a spanwise view of the winglet shown in FIG. 3 taken at line 4-4.
Figure 5:
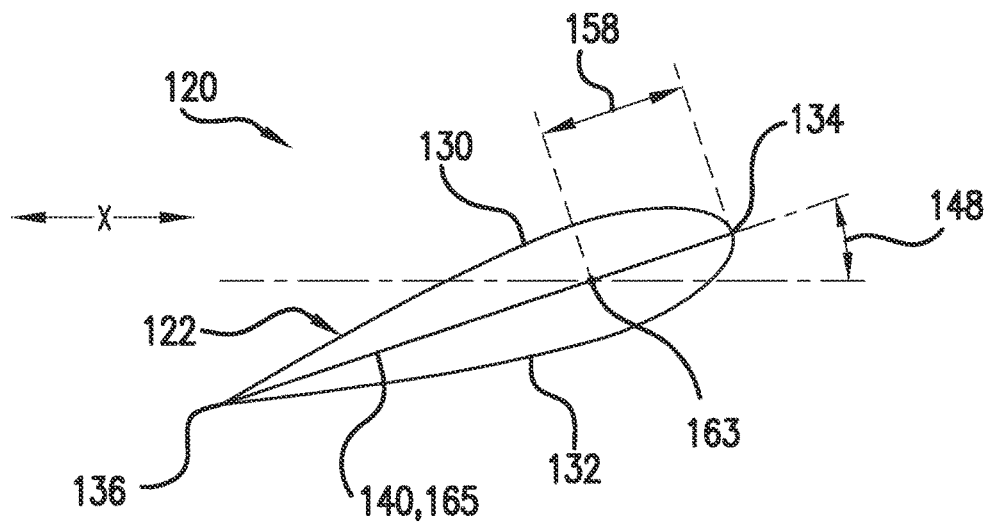
FIG. 5 illustrates a local cross-sectional view of a particular cross-sectional profile of the winglet shown in FIG. 3.
Figure 6:
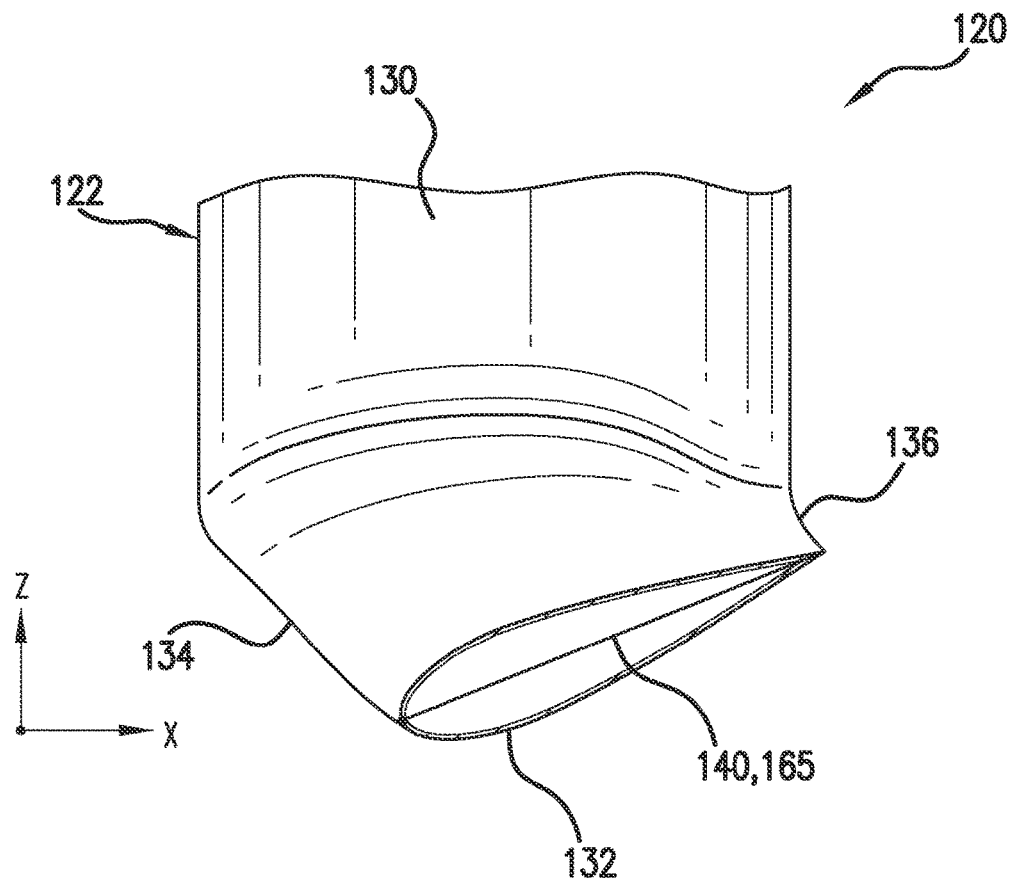
FIG. 6 illustrates a top, cross-sectional view of the winglet shown in FIG. 4 taken along line 6-6.

Referring now to FIGS. 3-6, various views of the embodiment of the winglet 120 shown in FIG. 2 are illustrated in accordance with aspects of the present subject matter. In particular, FIG. 3 illustrates a trailing edge view of the winglet 120 shown in FIG. 2. FIG. 4 illustrates a spanwise view of the winglet 120 shown in FIG. 3 taken at line 4-4. FIG. 5 illustrates a local cross-sectional view of a particular cross-sectional profile of the winglet 120 shown in FIG. 3. Additionally, FIG. 6 illustrates a top, cross-sectional view of the winglet 120 shown in FIG. 4 taken along line 6-6.

As particularly shown in FIG. 3, the disclosed winglet 120 generally comprises a winglet body 122 extending from a first end 124 disposed at an interface 126 defined between the winglet 120 and the body 106 to a second end 128 disposed at the blade tip 104. In general, the winglet body 122 may be configured similarly to the body 106 of the rotor blade 100. For instance, the winglet body 122 may generally define an aerodynamic profile, such as by defining a symmetrical or cambered airfoil-shaped cross-section. Thus, the winglet body 122 may also include a pressure side 130 and a suction side 132 extending between a leading edge 134 and a trailing edge 136. It should be appreciated that, in several embodiments, the aerodynamic profile of the winglet body 122 at the interface 126 (i.e., at the first end 124 of the winglet body 122) may generally correspond to the aerodynamic profile of the body 106 at the interface 126 such that a generally smooth and continuous aerodynamic profile may be defined between the winglet 120 and the body 106.

It should be appreciated that the use of the term "interface" need not be limited to embodiments in which the winglet body 122 is formed as a separate component and is separately mounted to the body 106. For example, in embodiments in which the winglet body 122 and the body 106 are formed integrally, the term "interface" may be used to simply correspond to a reference location from which the disclosed winglet body 122 is defined.

Additionally, in accordance with aspects of the present subject matter, the winglet body 122 may also have a unique geometric shape designed to improve the overall efficiency and performance of the rotor blade 100. In particular, due to the unique shape, the disclosed winglet 120 may enhance the displacement of vortices at the blade tip 104, thereby decreasing tip losses and increasing the power coefficient of the wind turbine 10 (FIG. 1). The winglet shape is also designed to increase the annual energy production (AEP) of the wind turbine 10 without increasing loads (e.g., thrust) or the rotor diameter, thereby reducing the cost of the energy generated by the wind turbine 10. Moreover, because the winglet 120 is configured as a pressure side winglet, the clearance between the rotor blade 100 and the tower 12 (FIG. 1) is not decreased.

In general, the unique shape of the winglet body 120 may be defined by one or more design parameters including, but not limited to, spanwise radius 138, chord 140, sweep 144, pre-bend 146, twist angle 148 and cant angle 150, all of which are design parameters that are generally known and understood by those of ordinary skill in the aerodynamic arts. For purposes of the present disclosure, one or more of these design parameters may be defined relative to a winglet origin 157 of the winglet 120, which generally corresponds to the point along the winglet body 122 at which the disclosed winglet shape originates, with the winglet shape being defined between the winglet origin 157 and the blade tip 104. As shown in FIG. 3, in one embodiment, the winglet origin 157 may be spaced apart any suitable distance 159 from the interface 126 defined between the between the winglet body 122 and the blade body 106. However, in other embodiments, the winglet origin 157 may be defined directly at the interface 126.

Figure 7:
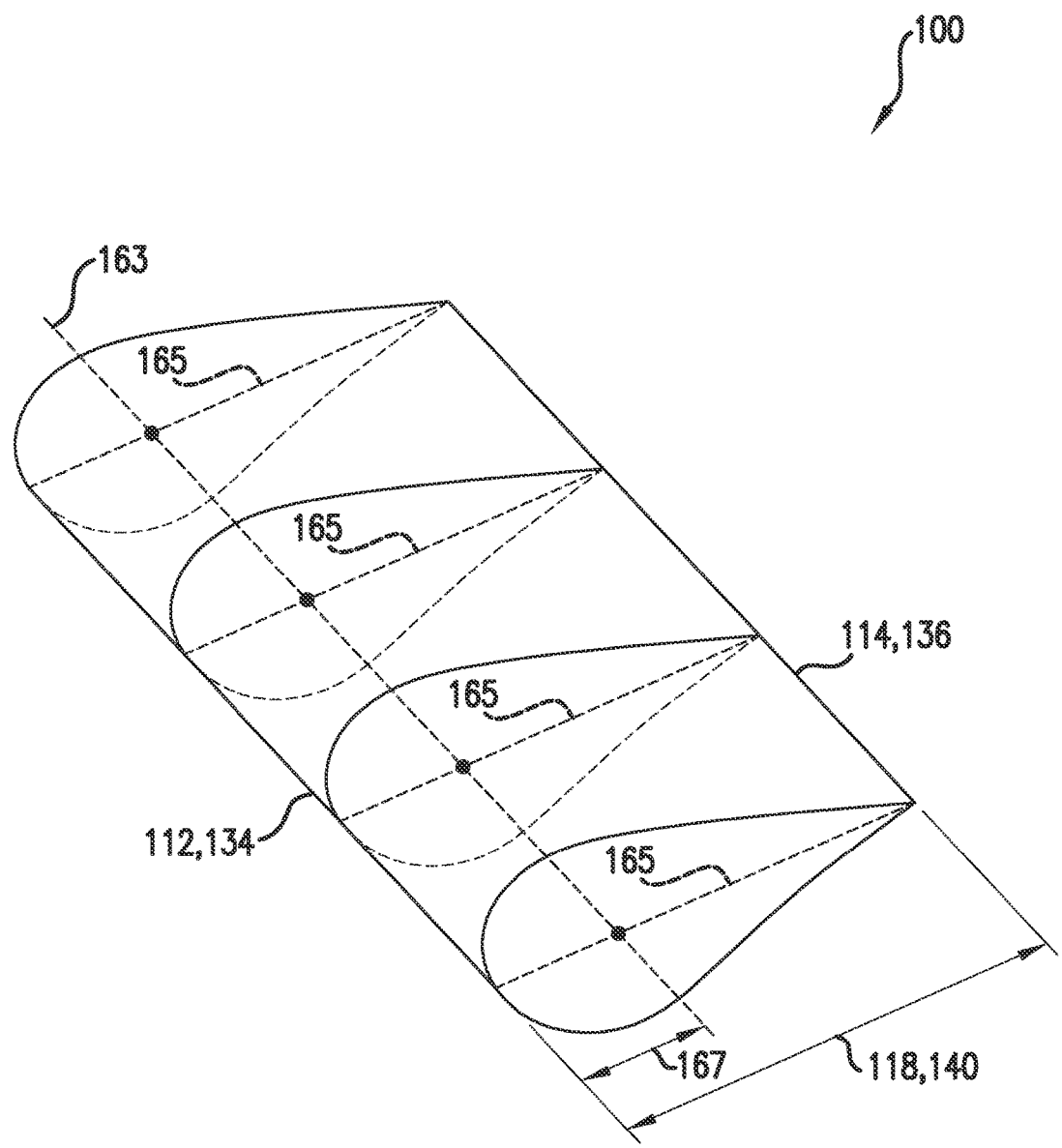
FIG. 7 illustrates a perspective view of a portion of the disclosed rotor blade, particularly illustrating a blade reference line extending through the chords defined at each cross-sectional profile of the rotor blade.

To establish the location of the winglet origin 157 along the winglet body 122, a blade reference line 163 may be defined that extends through the rotor blade 100 between the blade root 102 and the blade tip 104. As shown in FIG. 7, the blade reference line 163 may extend through a chord line 165 defined at each cross-sectional profile between the leading and trailing edges 112, 134, 114, 136 of the rotor blade 100. Specifically, in several embodiments, the blade reference line 163 may extend through the chord line 165 defined at each cross-sectional profile at a 30% chord location (i.e., a distance 167 from the leading edge 112, 134 of the blade 100 equal to 30% of the chord 118, 140 at such cross-sectional profile).

Figure 8:
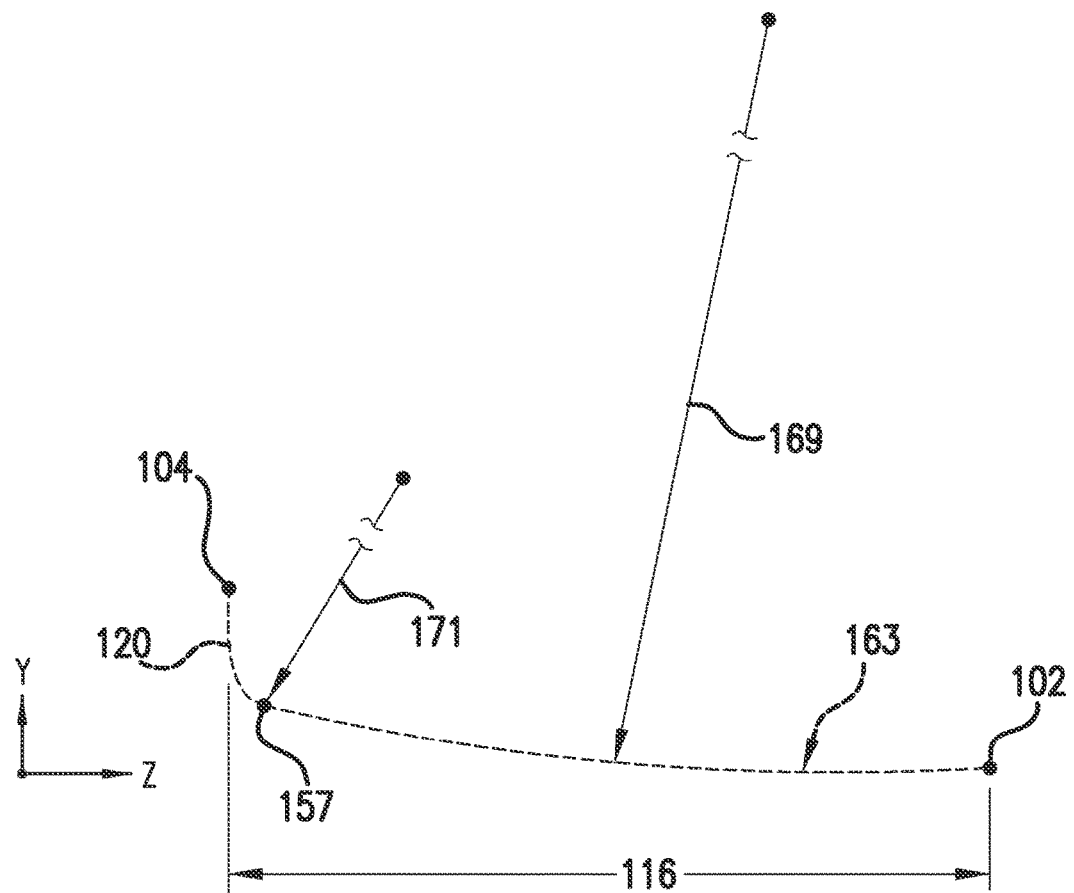
FIG. 8 illustrates one embodiment of the blade reference line shown in FIG. 7, particularly illustrating the differing radii of curvature of the blade reference line.

In general, the location of the winglet origin 157 along the winglet body 122 may be defined based on a radius of curvature 169, 171 of the reference line 163. Specifically, in several embodiments, the winglet origin 157 may be located along the reference line 163 at the point at which the radius of curvature 169, 171 of the reference line 163 projected into the global Y-Z plane is equal to less than two times the overall length or span 116 of the rotor blade 100. For example, FIG. 8 illustrates one embodiment of a blade reference line 163 for the disclosed rotor blade 100 extending between the blade root 102 and the blade tip 104. As shown, the portion of the blade reference line 163 extending between the blade root 102 and the winglet origin 157 may define a radius of curvature 168 that is equal to greater than two times the span 116 of the rotor blade 100. However, as the blade reference line 163 extends towards the blade tip 104, the curvature of the reference line 163 tightens such that a radius of curvature 171 is defined at the winglet origin 157 that is less than two times the span 116 of the rotor blade 100.

It should be appreciated that various design parameters of the disclosed winglet 120 may be defined as a function of the blade reference line 163. For instance, the local Y-coordinate of the blade reference line 163 may generally correspond to the pre-bend 146 of the winglet 120 (defined below) at each radial location along the winglet shape. Similarly, the local Z-coordinate of the blade reference line 163 may generally correspond to the spanwise radius 138 (defined below) of the winglet 120. In addition, the position of each cross-sectional profile of the rotor blade 100 relative to the blade reference line 163 may be used to control the shape of the leading and trailing edges 134, 136 of the winglet 120 and may also be used as the reference point for defining the twist angle 148 of the winglet 120.

Additionally, it should be appreciated that many of the design parameters described herein may be defined relative to a local coordinate system having its origin at the winglet origin 157. In general, the local X-axis (indicated by the X-axes shown in FIGS. 4-6) extends parallel to the global X-axis (FIG. 2) defined above. The local Z-axis (indicated by the Z-axes shown in FIGS. 3 and 6) extends tangent at the winglet origin 157 to the reference line 163. The local Y-axis (indicated by the Y-axes shown in FIGS. 3 and 4) extends perpendicular to both the local X-axis and the local Z-axis.

As shown in FIG. 3, the disclosed winglet 120 may generally define a spanwise length or radius 138 corresponding to the length of the winglet shape along the local Z-axis. Specifically, the spanwise radius 138 of the winglet shape may be defined along a reference line extending parallel to the local Z-axis from the winglet origin 157 to the blade tip 104. In several embodiments, the spanwise radius 138 measured between the winglet origin 157 and the blade tip 104 may range from about 1200 mm (millimeters) to about 2000 mm, such as from about 1400 mm to about 1800 mm or from about 1500 mm to about 1700 mm and all other subranges therebetween. Additionally, in several embodiments, in terms of a percentage of the span 116 of the rotor blade 100, the spanwise radius 138 measured between the winglet origin 157 and the blade tip 104 may range from about 2.4% of the span 116 to about 4.0% of the span 116, such as from about 2.8% of the span 116 to about 3.6% of the span 116 or from about 3.0% of the span 116 to about 3.4% of the span 116 and all other subranges therebetween.

As shown FIGS. 4 and 5, the winglet 120 may also define a chord 140 generally corresponding to the length of the winglet body 122 along the chord line 165 extending between the leading and trailing edges 134, 136 of the winglet 120. It should be appreciated that, in several embodiments, the chord 140 may generally decrease along the spanwise radius 138 of the winglet 120 as the winglet body 122 extends from the winglet origin 157 to the blade tip 104. For example, in a particular embodiment of the present subject matter, the chord 140 at the winglet origin 157 may range from about 600 mm to about 1300 mm, such as from about 750 mm to about 1150 mm or from about 900 mm to about 1000 mm and all other subranges therebetween and the chord 140 at the blade tip 104 may range from about 0 mm to about 250 mm, such as from about 50 mm to about 150 mm or from about 85 mm to about 95 mm and all other subranges therebetween. Additionally, in several embodiments, in terms of a percentage of the span 116 of the rotor blade 100, the chord 140 at the winglet origin 157 may range from about 1.2% of the span 116 to about 2.6% of the span 116, such as from about 1.5% of the span 116 to about 2.3% of the span 116 or from about 1.8% of the span 116 to about 2.0% of the span 116 and all other subranges therebetween, and the chord 140 at the blade tip 104 may range from about 0.0% of the span 116 to about 0.5% of the span 116, such as from about 0.10% of the span 116 to about 0.24% of the span 116 or from about 0.17% of the span 116 to about 0.19% of the span 116 and all other subranges therebetween, it should be appreciated that the range of chord values at the blade tip 104 may extend to zero in order to accommodate winglets 120 having a rounded tip.

Further, the winglet shape may also be defined based on the translation or sweep 144 of the winglet 120 along the local X-axis. Specifically, as shown in FIG. 4, the sweep 144 may be measured along a reference line extending parallel to the local X-axis and may correspond to the distance along such reference line between a particular chord location of the winglet body 122 at the winglet origin 157 and a corresponding chord location at a different radial location along the winglet body 122. For instance, the amount of sweep 144 of the winglet 120 at a particular radial location along the winglet body 122 may be defined as the distance from a quarter chord location 160 at the winglet origin 157 (i.e., a distance from the leading edge 134 equal to 25% of the chord 140 at the winglet origin 157) to a quarter chord location at that particular radial location (i.e., a distance from the leading edge 134 equal to 25% of the chord 140 at the particular radial location). Thus, in several embodiments, the total amount of sweep 144 in the shape of the disclosed winglet 120 (defined from a point on the reference line 163 at the winglet origin 157 to a point on the reference line 163 at the blade tip 104) may range from about 250 mm to about 2000 mm, such as from about 850 mm to about 1400 mm or from about 1100 mm to about 1175 mm and all other subranges therebetween. Additionally, in several embodiments, in terms of a percentage of the span 116 of the rotor blade 100, the total amount of sweep 144 in the shape of the disclosed winglet 120 (defined from a point on the reference line 163 at the winglet origin 157 to a point on the reference line 163 at the blade tip 104) may range from about 0.5% of the span 116 to about 4.0% of the span 116, such as from about 1.7% of the span 116 to about 2.8% of the span 116 or from about 2.2% of the span 116 to about 2.4% of the span 116 and all other subranges therebetween. It should be appreciated that a positive value for sweep 144 may generally translate the leading edge 134 of the winglet 120 in the positive local X direction, as shown in FIG. 4. It should also be appreciated that, in alternative embodiments, the sweep 144 may be defined relative to any other suitable chord locations, such as 35% chord locations, 50% chord locations, 75% chord locations and the like.

Additionally, as shown in FIG. 3, the shape of the winglet body 122 may also be defined based on the height or amount of pre-bend 146 of the winglet 120. The pre-bend 146 may generally be measured along a reference line extending parallel to the local Y-axis and may correspond to the distance along such reference line between a particular chord location of the winglet body 122 at the winglet origin 157 and a corresponding chord location at a different radial location along the winglet body 122. For instance, the amount of pre-bend 146 at a particular radial location along the winglet 120 may be defined from the trailing edge 136 of the winglet body 122 at the winglet origin 157 to the trailing edge 136 of the winglet body 122 at that particular radial location. Thus, in several embodiments, the total amount of pre-bend 146 of the winglet 120 (defined from the trailing edge 136 at the winglet origin 157 to the trailing edge 136 at the blade tip 104) may range from about 750 mm to about 2250 mm, such as from about 1200 mm to about 1800 mm or from about 1400 mm to about 1600 mm and all other subranges therebetween. Additionally, in several embodiments, in terms of a percentage of the span 116 of the rotor blade 100, the total amount of pre-bend 146 of the winglet 120 (defined from the trailing edge 136 at the winglet origin 157 to the trailing edge 136 at the blade tip 104) may range from about 1.5% of the span 116 to about 4.5% of the span 116, such as from about 2.4% of the span 116 to about 3.6% of the span 116 or from about 2.8% of the span 116 to about 3.2% of the span 116 and all other subranges therebetween. It should be appreciated that a positive value for pre-bend 136 may generally be towards the pressure side 130 of the winglet 120 (i.e., in the negative local Y direction).

Moreover, each cross-sectional profile of the winglet 120 may also be rotated about the blade reference line 163, thereby defining a twist angle 148 for setting the angle of attack of each cross-sectional profile of the winglet relative to the wind direction. As shown in FIG. 5, the twist angle 148 at each cross-sectional profile of the winglet 120 may generally correspond to the angle between a reference line extending parallel to the chord 140 and a reference line extending parallel to the local X-axis through the reference line 163. In several embodiments, the twist angle 148 of the winglet 120 may vary along the spanwise radius 138. For instance, in a particular embodiment of the present subject matter, the twist angle 148 at the winglet origin 157 may range from about −4.6 degrees to about 1.4 degrees, such as from about −3.0 degrees to about 0.0 degrees or from about −2.0 degrees to about −1.0 degree and all other subranges therebetween. Similarly, the twist angle 148 at the blade tip 104 may range from about −4.0 degrees to about 2.0 degrees, such as from about −2.0 degrees to about 0.0 degrees or from about −1.5 degrees to about 0.5 degrees and all other subranges therebetween. It should be appreciated that a negative value for the twist angle 148 generally corresponds to a rotation of the winglet 120 towards stall. In other words, a negative value for the twist angle 148 may rotate the leading edge 134 so as to increase the local angle of the attack of the winglet 120.

Further, the winglet 120 may also define a cant angle 150 corresponding to the rotation of the winglet body 122 about each local chord 140 along the spanwise radius 138. Specifically, as shown in FIG. 3, the cant angle 150 at a particular radial location along the winglet body 122 may be defined as the angle measured in the local Y-Z plane between a reference line extending parallel to the local Z-axis and a reference line extending tangent to the blade reference line 163 at that particular radial location. For instance, in several embodiments, the cant angle 150 at the blade tip 104 (i.e., at the second end 128 of the winglet body 122) may range from about 60 degrees to about 130 degrees, such as from about 70 degrees to about 100 degrees or from about 80 degrees to about 90 degrees and all other subranges therebetween. It should be appreciated that a positive value for the cant angle 150 will generate a pressure side winglet, as shown in the illustrated embodiment.

Moreover, in several embodiments, the winglet 120 may define a minimum bend radius. For instance, in one embodiment, the radius of curvature 171 (FIG. 8) of a portion of the reference line 163 extending between the winglet origin 157 and the blade tip 104 may be at least 50 centimeters (cm).

Additionally, it should be appreciated that the overall curvature of the winglet 120 may generally be defined by any suitable curve fit. For instance, in several embodiments, the overall curvature of the winglet 120 may be defined by an ellipse, a parabolic fit, an exponential fit or any other suitable type of curve fit.

Further, in a particular embodiment of the present subject matter, a nominal geometric shape for the winglet 120 may be defined by the values provided in TABLE 1. As indicated above, the spanwise radius 138 of the winglet 120 may generally be defined relative to the winglet origin 157 and may extend from such origin 157 to the blade tip 104. Thus, as shown in TABLE 1, the spanwise radius 138 at radial location #1 (i.e., defined at the winglet origin 157) may be equal to 0.00 mm, with the spanwise radius 138 increasing to radial location #10 (i.e., defined at the blade tip 104 or second end 128). Moreover, in addition to the spanwise radius 138, values for the chord 140, sweep 144, pre-bend 146, twist angle 148 and cant angle 150 of the winglet 120 at each radial location are provided so as to generally provide a complete nominal shape of the winglet body 122 between the winglet origin 157 and the blade tip 104.

TABLE 1

| Radial Location | Spanwise Radius (mm) | Chord (mm) | Sweep (mm) | Pre-bend (mm) | Twist Angle (deg) | Cant Angle (deg) |
| --- | --- | --- | --- | --- | --- | --- |
| 1 | 0.00 | 958.25 | 0.00 | 0.00 | −1.63 | 0.00 |
| 2 | 220.91 | 946.06 | 24.74 | 10.43 | −1.70 | 4.03 |
| 3 | 449.68 | 924.51 | 64.58 | 47.37 | −1.94 | 11.74 |
| 4 | 683.36 | 889.20 | 123.49 | 115.33 | −2.37 | 19.70 |
| 5 | 914.48 | 834.88 | 206.03 | 222.29 | −2.96 | 29.07 |
| 6 | 1131.82 | 755.77 | 317.05 | 373.21 | −3.29 | 39.82 |
| 7 | 1321.59 | 645.30 | 462.07 | 568.77 | −1.74 | 51.70 |
| 8 | 1468.88 | 496.45 | 647.09 | 805.00 | −1.08 | 64.73 |
| 9 | 1559.45 | 334.76 | 840.25 | 1071.00 | −1.02 | 79.00 |
| 10 | 1595.20 | 90.19 | 1125.41 | 1500.00 | −1.00 | 86.06 |

It should be appreciated by those of ordinary skill in the art that each radial location (radial location #s 1-10) provided in TABLE 1 generally corresponds to a particular location along the winglet body 122 at which a cross sectional profile (e.g., similar to the cross-sectional profile shown in FIG. 5) of the winglet 120 is defined using the given values. Accordingly, it should be appreciated that the disclosed winglet 120 may be physically manufactured and/or graphically modeled using the values provided in TABLE 1 to define the shape and/or orientation of the cross-sectional profiles at each radial location. Such cross-sectional profiles may then be lofted, connected and/or otherwise joined using any suitable means known in the art (e.g., by connecting each cross-sectional profile with smooth continuing arcs using suitable computer modeling or drawing software) in order to define the total winglet shape.

Additionally, the values provided in TABLE 1 are shown to two decimal places for defining the shape of the winglet body 122 between the winglet origin 157 and the blade tip 104. However, it is believed that the values defining the winglet shape may be varied without impairment of the advantages provided by the disclosed winglet 120. Accordingly, the values given in TABLE 1 are for a nominal winglet shape. It will therefore be appreciated that plus or minus (+/−) variations of each of the values provided in TABLE 1 including, but not limited to, +/− variations for manufacturing tolerances and other design considerations may be made without exceeding the scope of the present disclosure. For instance, in one embodiment, a margin of about +/−10% of the length values (i.e., spanwise radius 138, chord 140, sweep 144 and pre-bend 146) at each radial location, a margin of about +/−20 degrees of the cant angle values at each radial location and a margin of about +/−3 degrees of the twist angle values at each radial location may define a profile envelope for the winglet shape disclosed in TABLE 1. In another embodiment, the profile envelope for the winglet shape disclosed in TABLE 1 may be defined by a margin of about +/−5% of the length values at each radial location, a margin of about +/−10 degrees of the cant angle values at each radial location and a margin of about +/−1.5 degrees of the twist angle values at each radial location.

It should also be appreciated that the nominal winglet shape provided in TABLE 1 may be scaled up or down geometrically for use with rotor blades 100 having any suitable dimensions and/or configuration. Consequently, the values provided in TABLE 1 at each radial location may be a function of one or more constants. That is, the given values may be multiplied or divided by the same constant or by differing constants depending on the particular design parameter being scaled to provide a "scaled-up" or "scaled-down" version of the disclosed winglet 120, while retaining the winglet shape disclosed herein. This scaling could be used to adapt the winglet 120 to a larger or smaller blade. For instance, in one embodiment, one or more of the length values (i.e., spanwise radius 138, chord 140, sweep 144 and pre-bend 146) may be multiplied or divided by a first constant and one or more of the angle values (i.e., twist angle 148 and cant angle 150) may be multiplied, or divided by a second constant.

In particular embodiments of the present subject matter, the values provided in TABLE 1 may be scaled as a function of the overall length or span 116 of the rotor blade 100. For instance, TABLE 2 below shows the length values (i.e., spanwise radius 138, chord 140, sweep 144 and pre-bend 146) provided in TABLE 1 defined as a percentage of the span 116 of the rotor blade 100, with the angle values (i.e., twist angle 148 and cant angle 150) remaining unchanged. Accordingly, as the span 116 of the rotor blade 100 is increased/decreased, the length values provided in TABLE 1 may be correspondingly increased/decreased.

TABLE 2

| Radial Location | Spanwise Radius (% of Span) | Chord (% of Span) | Sweep (% of Span) | Pre-bend (% of Span) | Twist Angle (deg) | Cant Angle (deg) |
| --- | --- | --- | --- | --- | --- | --- |
| 1 | 0.00% | 1.92% | 0.00% | 0.00% | −1.63 | 0.00 |
| 2 | 0.44% | 1.89% | 0.05% | 0.02% | −1.70 | 4.03 |
| 3 | 0.90% | 1.85% | 0.13% | 0.09% | −1.94 | 11.74 |
| 4 | 1.37% | 1.78% | 0.25% | 0.23% | −2.37 | 19.70 |
| 5 | 1.83% | 1.67% | 0.41% | 0.44% | −2.96 | 29.07 |
| 6 | 2.26% | 1.51% | 0.63% | 0.75% | −3.29 | 39.82 |
| 7 | 2.64% | 1.29% | 0.92% | 1.14% | −1.74 | 51.70 |
| 8 | 2.94% | 0.99% | 1.29% | 1.61% | −1.08 | 64.73 |

TABLE 2-continued

| Radial Location | Spanwise Radius (% of Span) | Chord (% of Span) | Sweep (% of Span) | Pre-bend (% of Span) | Twist Angle (deg) | Cant Angle (deg) |
|---|---|---|---|---|---|---|
| 9 | 3.12% | 0.70% | 4.20% | 2.14% | −1.02 | 79.00 |
| 10 | 3.19% | 0.18% | 2.25% | 3.00% | −1.00 | 86.06 |

It should be appreciated that, similar to the values provided in TABLE 1, the percentages provided in TABLE 2 may be varied without impairment of the advantages provided by the disclosed winglet 120. Specifically, plus or minus (+/−) variations of each of the percentages provided in TABLE 2 including, but not limited to, +/− variations for manufacturing tolerances and other design considerations may be made without exceeding the scope of the present disclosure. For example, in one embodiment, each of the length values shown in TABLE 2 (i.e., spanwise radius 138, chord 140, sweep 144 and pre-bend 146) may be varied +/−25% and each of the angle values (i.e., twist angle 148 and cant angle 150) shown in TABLE 2 may be varied +/−3.0 degrees. However, in other embodiments, each of the values shown in TABLE 2 may be varied by different percentages.

Additionally, as an alternative to defining the shape of the winglet body using all of the values provided in TABLE 1, the winglet shape may also be defined using the table values for a combination of two or more design parameters at each radial location. For instance, in several embodiments, the disclosed winglet shape may be defined at each radial location simply using the values for chord 140 and twist angle 148 provided in TABLE 1. In such embodiments, the values for chord 140 may generally be varied +/−25% at each radial location and the values for twist angle 148 may generally be varied +/−3.0 degrees at each radial location to accommodate manufacturing tolerances and other design considerations. In other embodiments, various other combinations of design parameters may be used to define the winglet 120, such as by using the values for sweep 144 and pre-bend 146 at each radial location or by using the values for sweep 144 and cant angle 150 at each radial location, with the values of such combinations having a suitable +/− variation to accommodate manufacturing tolerances and other design considerations.

Moreover, it should be appreciated that, in addition to the advantages provided by the unique shape of the disclosed winglet 120, further advantages may be obtained when the winglet 120 comprises a separate component configured to be separately attached to the body 106 of the rotor blade 100. In particular, a modular configuration may allow the winglet 120 to be easily and efficiently manufactured and stored, thereby reducing overall production costs. Additionally, as a separate component, the winglet 120 may be easily transported from the manufacturing facility to the field and may be mounted into the rotor blade 100 without the necessity of removing such rotor blade 100 from the wind turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A winglet for a rotor blade, comprising:
a winglet body extending at least partially between a winglet origin and a blade tip and including a plurality of radial locations between the winglet origin and the blade tip, the winglet body defining a sweep at each of the plurality of radial locations generally in accordance with the values for sweep shown in TABLE 1,
wherein the winglet body further defines a cant angle, the cant angle at the blade tip ranging from 60 degrees to 130 degrees, and
wherein each of the values for sweep shown in TABLE 1 is variable within a tolerance range of +/−10%.

2. The winglet of claim 1, wherein the cant angle at a given radial location along the winglet body is defined as an angle measured in a local Y-Z plane of the winglet body between a reference line extending parallel to a local Z-axis for the winglet body and a reference line extending tangent to a blade reference line for the rotor blade at the given radial location.

3. The winglet of claim 1, wherein the cant angle at the blade tip ranges from 70 degrees to 100 degrees.

4. The winglet of claim 1, wherein the winglet body further defines a chord, the chord at the winglet origin ranging from 1.2% to 2.6% of the span of the rotor blade.

5. The winglet of claim 1, wherein the winglet body further defines a chord, the chord at the blade tip ranging from 0.0% to 0.5% of the span of the rotor blade.

6. The winglet of claim 1, wherein the winglet body further defines a spanwise radius, the spanwise radius defined between the winglet origin and the blade tip ranging from 2.4% to 4% of the span of the rotor blade.

7. The winglet of claim 1, wherein the winglet body further defines a twist angle, the twist angle at the winglet origin ranging from −4.6 degrees to 1.4 degrees.

8. The winglet of claim 1, wherein the winglet body further defines a twist angle, the twist angle at the blade tip ranging from −4.0 degrees to 2.0 degrees.

9. The winglet of claim 1, wherein the winglet body further defines a pre-bend between the winglet origin and the blade tip that ranges from 1.5% to 4.5% of the span of the rotor blade.

10. A winglet for a rotor blade, comprising:
a winglet body extending at least partially between a winglet origin and a blade tip and including a plurality of radial locations between the winglet origin and the blade tip, the winglet body defining a sweep and a cant angle, the cant angle at a given radial location along the winglet body being defined as an angle measured in a local Y-Z plane of the winglet body between a reference line extending parallel to a local Z-axis for the winglet body and a reference line extending tangent to a blade reference line for the rotor blade at the given radial location, the cant angle being defined at each of the plurality of radial locations generally in accordance with the values for cant angle shown in TABLE 1, wherein the sweep defined between the winglet origin and the blade tip ranges from 1.7% to 2.8% of a span of the rotor blade, and wherein each of the values for cant angle shown in TABLE 1 is variable within a tolerance range of +/−20 degrees.

11. The winglet of claim 10, wherein the winglet body further defines a chord at the blade tip ranging from 0.0% to 0.5% of a span of the rotor blade and a chord at the winglet origin ranging from 1.2% to 2.6% of a span of the rotor blade.

12. A rotor blade for a wind turbine, the rotor blade comprising:

a blade body extending from a blade root towards a blade tip; and a winglet body extending between a winglet origin defined at an interface between the blade body and the winglet body and a tip end defined at the blade tip, the winglet body including a plurality of radial locations between the winglet origin and the blade tip, the winglet body defining a sweep and a pre-bend, the pre-bend being defined at each of the plurality of radial locations generally in accordance with the values for pre-bend shown in TABLE 1, wherein the sweep defined between the winglet origin and the blade tip ranges from 1.7% to 2.8% of a span of the rotor blade, and wherein each of the values for pre-bend shown in TABLE 1 is variable within a tolerance range of +/−10%.

13. The rotor blade of claim 12, wherein the winglet body further defines a cant angle, the cant angle at the blade tip ranging from 60 degrees to 130 degrees, the cant angle at a given radial location along the winglet body is defined as an angle measured in a local Y-Z plane of the winglet body between a reference line extending parallel to a local Z-axis for the winglet body and a reference line extending tangent to a blade reference line for the rotor blade at the given radial location.

14. The rotor blade of claim 13, wherein the cant angle at the blade tip ranges from 70 degrees to 100 degrees.

15. The rotor blade of claim 12, wherein the winglet body further defines a chord, the chord at the winglet origin ranging from 1.2% to 2.6% of the span of the rotor blade.

16. The rotor blade of claim 12, wherein the winglet body further defines a chord, the chord at the blade tip ranging from 0.0% to 0.5% of the span of the rotor blade.

17. The rotor blade of claim 12, wherein the winglet body further defines a spanwise radius, the spanwise radius defined between the winglet origin and the blade tip ranging from 2.4% to 4% of the span of the rotor blade.

18. The rotor blade of claim 12, wherein the winglet body further defines a twist angle, the twist angle at the winglet origin ranging from −4.6 degrees to 1.4 degrees.

19. The rotor blade of claim 12, wherein the winglet body further defines a twist angle, the twist angle at the blade tip ranging from −4.0 degrees to 2.0 degrees.

* * * * *